United States Patent
Vander Veen et al.

(10) Patent No.: US 7,231,226 B2
(45) Date of Patent: *Jun. 12, 2007

(54) SYSTEM AND METHOD FOR EVENT-DEPENDENT STATE ACTIVATION FOR A DUAL-MODE MOBILE COMMUNICATION DEVICE

(75) Inventors: Raymond P. Vander Veen, Kitchener (CA); Harry R. Major, Waterloo (CA); Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/481,234

(22) Filed: Jul. 5, 2006

(65) Prior Publication Data

US 2006/0252464 A1    Nov. 9, 2006

Related U.S. Application Data

(63) Continuation of application No. 10/016,957, filed on Dec. 7, 2001, now Pat. No. 7,076,267.

(51) Int. Cl.
*H04M 1/00*    (2006.01)
*H04M 3/42*    (2006.01)

(52) U.S. Cl. ............. 455/550.1; 455/567; 455/575.6; 455/415

(58) Field of Classification Search ............. 455/550.1, 455/567, 569.1, 575.1, 557.6, 415, 575.6
See application file for complete search history.

(56) References Cited

U.S. PATENT DOCUMENTS

| 5,542,105 A | 7/1996 | Finch et al. |
| 6,018,671 A | 1/2000 | Bremer |
| 6,115,620 A | 9/2000 | Colonna et al. |
| 6,643,528 B1 | 11/2003 | Shim et al. |
| 6,757,534 B2 | 6/2004 | Bach et al. |
| 6,983,169 B2 | 1/2006 | Vogel et al. |
| 7,027,840 B2 | 4/2006 | McKee et al. |
| 2002/0197995 A1 | 12/2002 | Starkovich et al. |

FOREIGN PATENT DOCUMENTS

GB    2 359 963 A    9/2001

*Primary Examiner*—Barry Taylor
(74) *Attorney, Agent, or Firm*—Jones Day; Krishna K. Pathiyal; Robert C. Liang

(57) ABSTRACT

A handheld mobile station system capable of automatically answering voice calls is disclosed. The system is comprised of a handheld mobile station, a magnet detection system within the mobile station, a magnet within a mobile station holster located in close proximity to the magnet detection system when the mobile station is stored in the holster wherein the mobile station is operable in a first, second, and third state. The first state occurs when the mobile station is stored in the holster and is ready to receive a voice call. The second state happens when the mobile station is stored in the holster and receiving an incoming voice call. The third state occurs when the mobile station is removed sufficiently out of the holster such that the magnet detection system no longer detects the close proximity of the magnet thereto thereby automatically answering the incoming voice call.

30 Claims, 7 Drawing Sheets

SYSTEM AND METHOD FOR EVENT-DEPENDENT STATE ACTIVATION FOR A DUAL-MODE MOBILE COMMUNICATION DEVICE

CROSS REFERENCE TO RELATED APPLICATIONS

This application is a continuation of U.S. Ser. No. 10/016,957, having the same title as this application, which was filed on Dec. 7, 2001 now U.S. Pat. No. 7,076,267. The entire disclosure and the drawing figures of this prior application is hereby incorporated by reference.

BACKGROUND OF THE INVENTION

1. Field of the Invention

This application relates to mobile devices. Specifically, this application relates to dual-mode communication devices for providing voice and data communications.

2. Description of the State of the Art

Mobile devices are known. Example mobile devices include cellular telephones, personal digital assistants ("PDAs"), wireless data devices like two-way pagers, voice/data communicators, etc. Recently, many companies have attempted to provide a mobile device that serves a variety of communication and organisational needs, such as data communication, voice communication or PDA functionality. For example, companies that primarily manufacture cellular telephones for voice communication, such as Nokia and Ericsson have integrated PDA functionality into their products. Firms that primarily manufacture PDA devices, such as Palm and Handspring, have integrated a wireless data modem into their products to provide data communication. And firms that primarily manufacture wireless data devices, such as Motorola and Research In Motion, have combined the functionality of a wireless data device, such as a two-way pager, with PDA functions.

Typically, in order to initiate or end an incoming voice communication on a mobile device, a key must be depressed. Usually, keys are dedicated on the keypad or keyboard solely for this function, such as 'TALK' or 'SEND' buttons to answer an incoming call, or 'END' to hang up a call.

Most PDA devices come with a holster or other carrying means. To answer an incoming voice call when a device is within a holster, the user would have to pull the device out of the holster and then press one or more buttons. A user needs to be able to quickly answer calls without searching for keys to press in order to connect the phone call. A user also needs to be able to quickly end calls without searching for keys to press.

SUMMARY

A system and method for changing the state for a dual-mode communication device or a handheld mobile station is provided. The system includes a mobile station with a magnet detection system, a magnet in a holster located in close proximity to the magnet detection system when the mobile station is stored in the holster wherein the mobile station is operable in a first, second and third state. The first state occurs when the mobile station is stored in the holster and is ready to receive a voice call. The second state occurs when the mobile station is still in the holster and receives an incoming voice call. The third state happens when the mobile station is sufficiently removed from the holster such that the magnet detection system no longer detects the close proximity of the magnet and thereby automatically answering the incoming voice call with no further input from the user. The device includes a transceiver, a display mounted within the front surface of the device housing, a QWERTY keyboard mounted below the display and within the front surface of the device housing, a microphone and a speaker, and a system for detecting that the device is within the holster.

The method includes steps of receiving an incoming voice call on the device, notifying the user of the voice call, removing the device from its holster, detecting that the device has been removed from the holster and then automatically answering the voice call without further input from the user.

The method continues with steps of detecting that the device has been returned to the holster and then changing from the third state to the first state upon detection, thereby hanging up the phone call.

Further features of the invention will be described or will become apparent in the course of the following detailed description.

BRIEF DESCRIPTION OF THE DRAWINGS

In order that the invention may be more clearly understood, the one or more embodiments thereof will now be described in detail by way of example, with reference to the accompanying drawings, in which.

DETAILED DESCRIPTION

Figure 1:
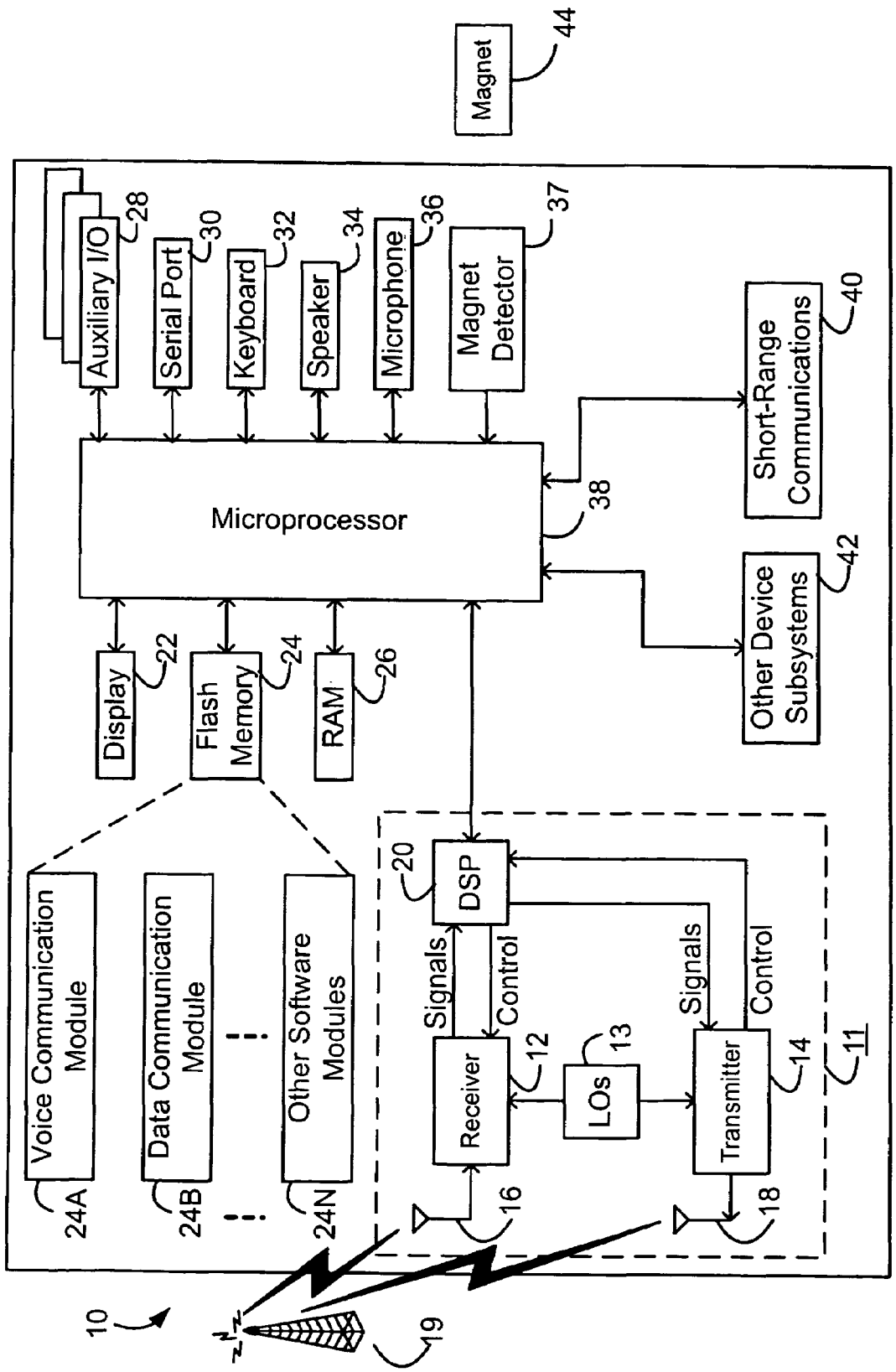
FIG. 1 is a block diagram of a handheld mobile station.

Turning now to the drawing figures, FIG. 1 is a block diagram of a dual-mode mobile communication device 10 or mobile station (herein referred to as device). The device 10 includes a transceiver 11, a microprocessor 38, a display 22, Flash memory 24, RAM memory 26, auxiliary input/output (I/O) devices 28, a serial port 30, a keyboard 32, a speaker 34, a microphone 36, a magnet detection system 37, a short-range wireless communications sub-system 40, and may also include other device sub-systems 42. The transceiver 11 preferably includes transmit and receive antennas 16, 18, a receiver 12, a transmitter 14, one or more local oscillators 13, and a digital signal processor 20. Within the Flash memory 24, the device 10 preferably includes a plurality of software modules 24A–24N that can be executed by the microprocessor 38 (and/or the DSP 20), including a voice communication module 24A, a data communication module 24B, and a plurality of other operational modules 24N for carrying out a plurality of other functions.

The mobile communication device 10 is preferably a two-way communication device having voice and data communication capabilities. Thus, for example, the device may communicate over a voice network, such as any of the analog or digital cellular networks, and may also communicate over a data network. The voice and data networks are depicted in FIG. 1 by the communication tower 19. These voice and data networks may be separate communication networks using separate infrastructure, such as base stations, network controllers, etc., or they may be integrated into a single wireless network.

A magnet is also shown in FIG. 1, outside of the device, in close physical proximity to the magnet detection system. This magnet is preferably located on a holster that is preferably used for storing the device. Thus, when the device is stored in the holster, the magnet of the holster is in close proximity to the device's magnet detection system.

Figure 2:
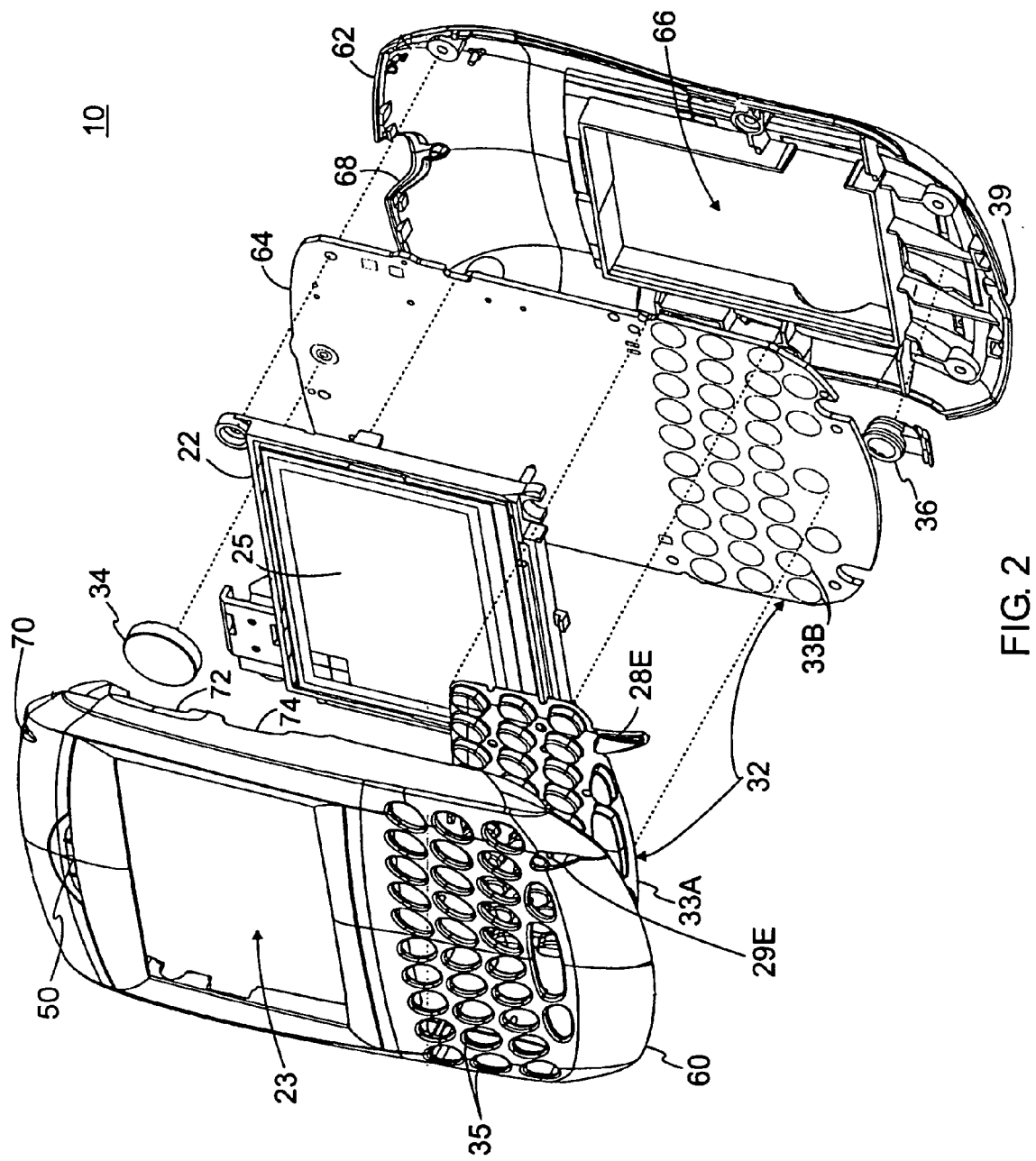
FIG. 2 is an exploded view of the device.

FIG. 2 shows a handheld mobile communication device assembly 10 which has a first device housing section 60 and a second device housing section 62 which as described above cooperate to couple together, using fasteners. It should be appreciated that fasteners are but one example of possible components that may be used to couple the device housing sections together. However, the device housing sections are preferably coupled together using releasable fasteners such as screws.

Also shown in FIG. 2 is a PCB (printed circuit board) 64, upon which most of the internal components of the mobile communication device are preferably mounted. The keyboard 32 is preferably formed by positioning a key web 33A over a plurality of switches 33B on the PCB 64. The key web 33A and plurality of switches 33B are preferably configured such that each key in the key web 33A contacts and operates one of the switches 33B when the key is depressed. Other configurations may also be implemented, in which the number of switches 33B may be less than the number of keys on the key web 33A. The key web 33A and switches 33B on PCB 64 are also positioned such that the apertures 35 at least partially expose the keyboard 32. As will be apparent from FIG. 2, portions of the key web 33A will be exposed by the apertures 35 to provide key surfaces that may be depressed by a user of the device 10 to provide data input to the device 10. Such data input may for example be used to generate data communications on the device 10. In the example device 10 shown in FIG. 2, the auxiliary key 28E is adjacent to the keyboard 32, such that the auxiliary key 28E is shown as part of the key web 33A and at least partially exposed by the aperture 29E. However, in alternate embodiments, the auxiliary key 28E or other auxiliary keys (not shown) need not be provided as part of the key web 33A. Such keys may be separate from the key web 33A.

The display 22 is also preferably mounted on the PCB 64, as shown in FIG. 2. When the first device housing section 60 and second device housing section 62 are coupled together, the aperture 23 in the first device housing section 60 at least partially exposes the display 22. For example, the aperture 23 in the first device housing section 60 and the display 22 on the PCB 64 may be positioned such that a viewing area 25 of the display is exposed. The frame and other components associated with the display 22 are preferably hidden from view when the first and second device housing sections 60 and 62 are coupled together.

The speaker 34 is preferably mounted at or near the top of the PCB 64. One or more apertures 35 in the first device housing section 60 are positioned to at least partially expose the speaker 34 when the first and second device housing sections 60 and 62 are coupled together.

In the example assembly shown in FIG. 2, the microphone 36 is preferably mounted in the second device housing section 62. The microphone 36 is at least partially exposed by the aperture 39 in the second device housing section, and coupled to the PCB and other device components. Audio or voice inputs to the microphone 36 may be used for example to generate voice communications.

The device housing sections may include further apertures to expose or partially expose other device components. In the first device housing section 60, apertures 70, 72 and 74 are configured to partially expose the auxiliary I/O devices not shown in FIG. 2. The aperture 68 is similarly positioned in the second device housing section 62 to at least partially expose an auxiliary I/O device (not shown) which is preferably an IrDA (Infrared Data Association) port. As described above, the aperture 29E at least partially exposes the auxiliary key 28E. The aperture 66 in the second device housing section 62 may be provided to accommodate a power supply such as a battery. Other apertures may also be provided in the device housing as necessary.

The first and second device housing sections, when coupled together, form a handheld mobile communication device housing enclosing the PCB and internal components therein. The apertures 35, 23, 50 and 39 at least partially expose the speaker 34, display 22, keyboard 32 and microphone 36 respectively. Partial exposure of these components allows a user to make use of these components while at the same time protecting the components from damage. Apertures 29E, 68, 70, 72, 74 similarly expose and protect auxiliary I/O devices. When access to a component will normally be required relatively infrequently, a removable cover element may be provided for a corresponding device housing aperture. In the above example of a device power supply, a cover (not shown) is preferably provided for the aperture 66. Access to the power supply is thereby possible when required; yet the battery remains protected when access thereto is not necessary.

Auxiliary I/O device 28A is a thumbwheel input device (seen in FIG. 2A) and is preferably mounted along the right hand side surface of the device housing 60, 62 immediately adjacent to the display 22. The thumbwheel input device 28A is used to select information on the display screen 22, and is thus optimally positioned adjacent to the display screen 22. Other mounting positions of the thumbwheel input device 28A are also possible, such as on the left side surface or in the front surface. The auxiliary input key 28E may be a device power key, a backlight key for turning a backlight for the display 22 on and off, a mode key for switching between voice communication, data communication and possibly other device functional modes, for example.

Figure 2A:
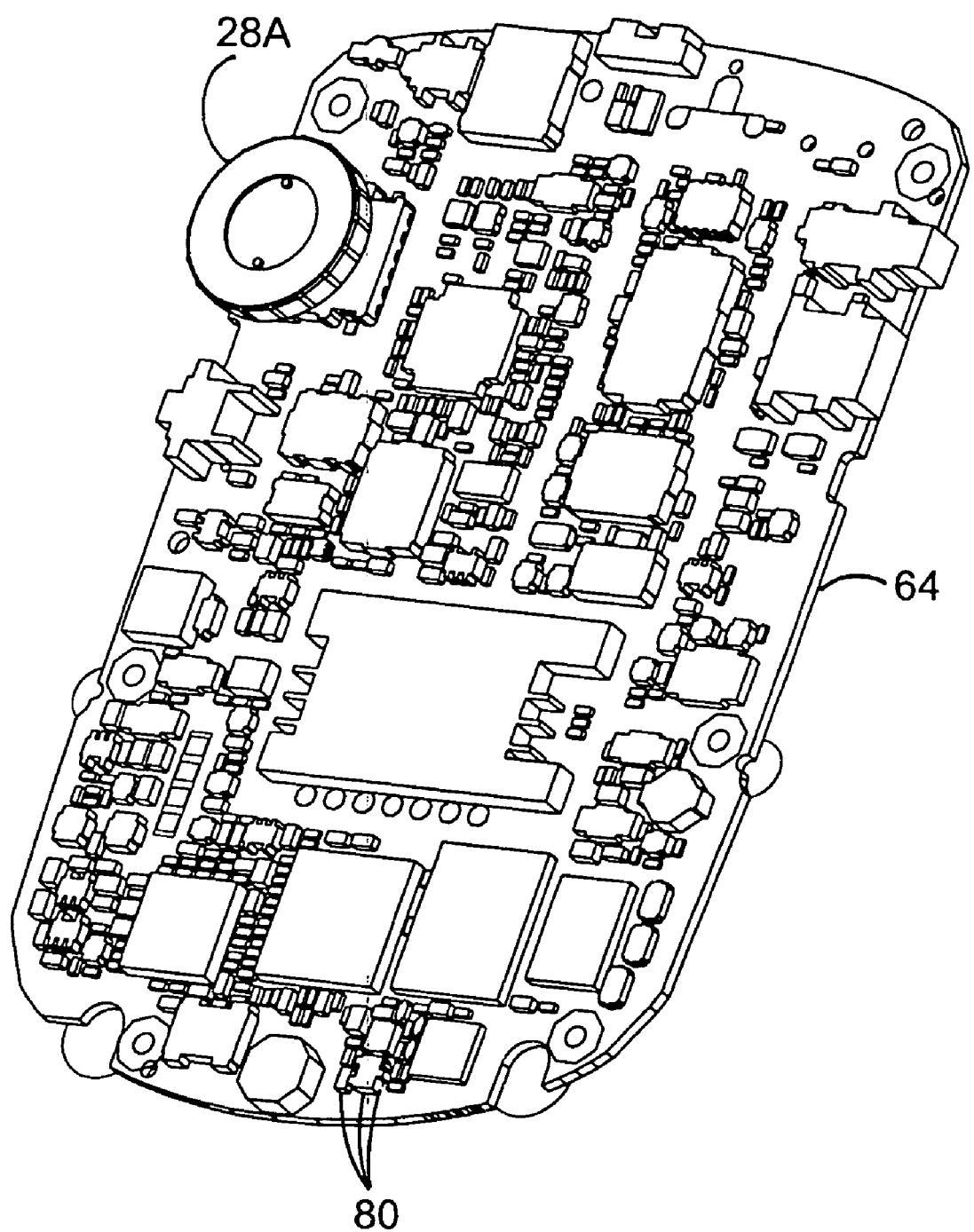
FIG. 2A is a view of the back of the PCB shown in FIG. 2.

FIG. 2A shows the back of the PCB from FIG. 2. This view of the PCB 64 shows the auxiliary input device 28A as a thumbwheel. It is preferably mounted in the top right-hand corner of the PCB 64 in this view. This view also shows the location of the magnet detection system 80. The components for the magnetic detection system 80 are preferably located close to the centre of the PCB 64 near the bottom. Other internal components of the device 10 may also be mounted on the PCB 64. The device components are interconnected to provide for at least data and voice communication functionality, possibly in addition to further local non-communication functions and short-range communication functions. The internal components of the device 10 are interconnected as necessary, through wired connections, PCB tracks, other types of connectors or connections, or possibly combinations thereof.

Figure 3:
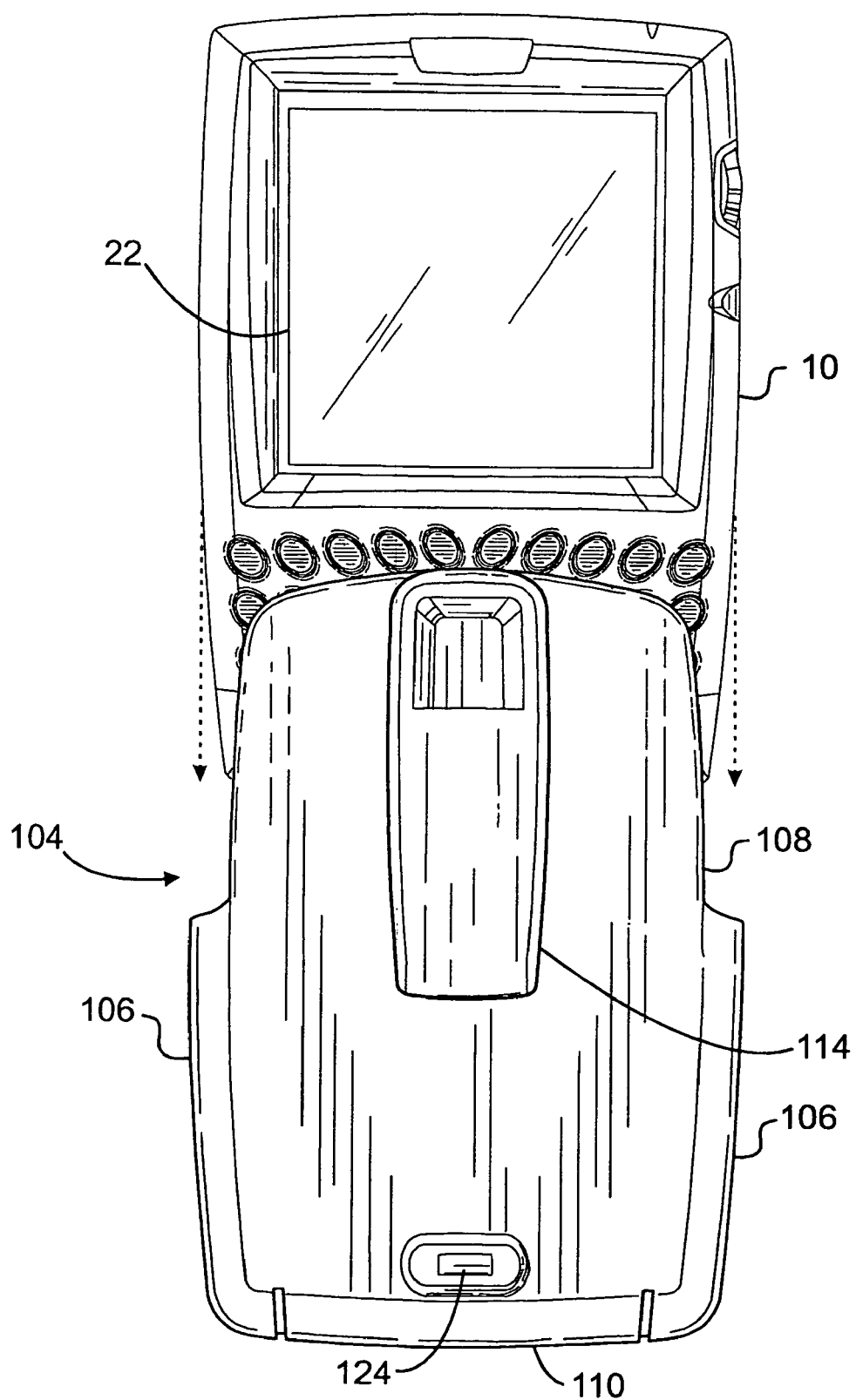
FIG. 3 is rear view of a holster for the device.

FIG. 3 shows the rear view of a typical holster for a device. The holster 104 preferably comprises a back 108 and sides 106 and bottom 110 that extend toward the front to form a repository for a mobile handheld device. Specifically, the holster 104 is generally open and includes curved side portions 106 and a bottom 110 formed to conform to the shape of the mobile handheld device.

The holster 104 will preferably have a clip assembly 114 that includes a clip that is spring loaded and attached to the back 108. The manner of attachment and assembly of the clip to the back 108 is described in Patent Application No. 09/305,174 Retaining Clip Assembly filed Mar. 4, 1999.

The holster 104 will preferably have a magnet 124 preferably located on the back 108 above the portion that forms the bottom 110 of the holster. The magnet 124 will be positioned preferably at an equidistant location from the sides 106 of the holster. The location of the magnet 124 is preferably in conjunction with the location of the magnet detection system 80 in the device when the device is placed in the holster.

FIG. 3 also shows how the device 10 is inserted into the holster 104. The device 10 preferably slides vertically downwards into the opening of the holster from the top of the holster 104. The device 10 is positioned such that the display screen 22 is facing the inside of the back of the holster 108 and the bottom of the device is pointing downwards such that the bottom of the device preferably engages the bottom of the holster when it is properly inserted. When the device 10 is properly inserted, the magnet 124 of the holster will preferably line up with the magnet detection system 80 of the device.

Figure 3A:
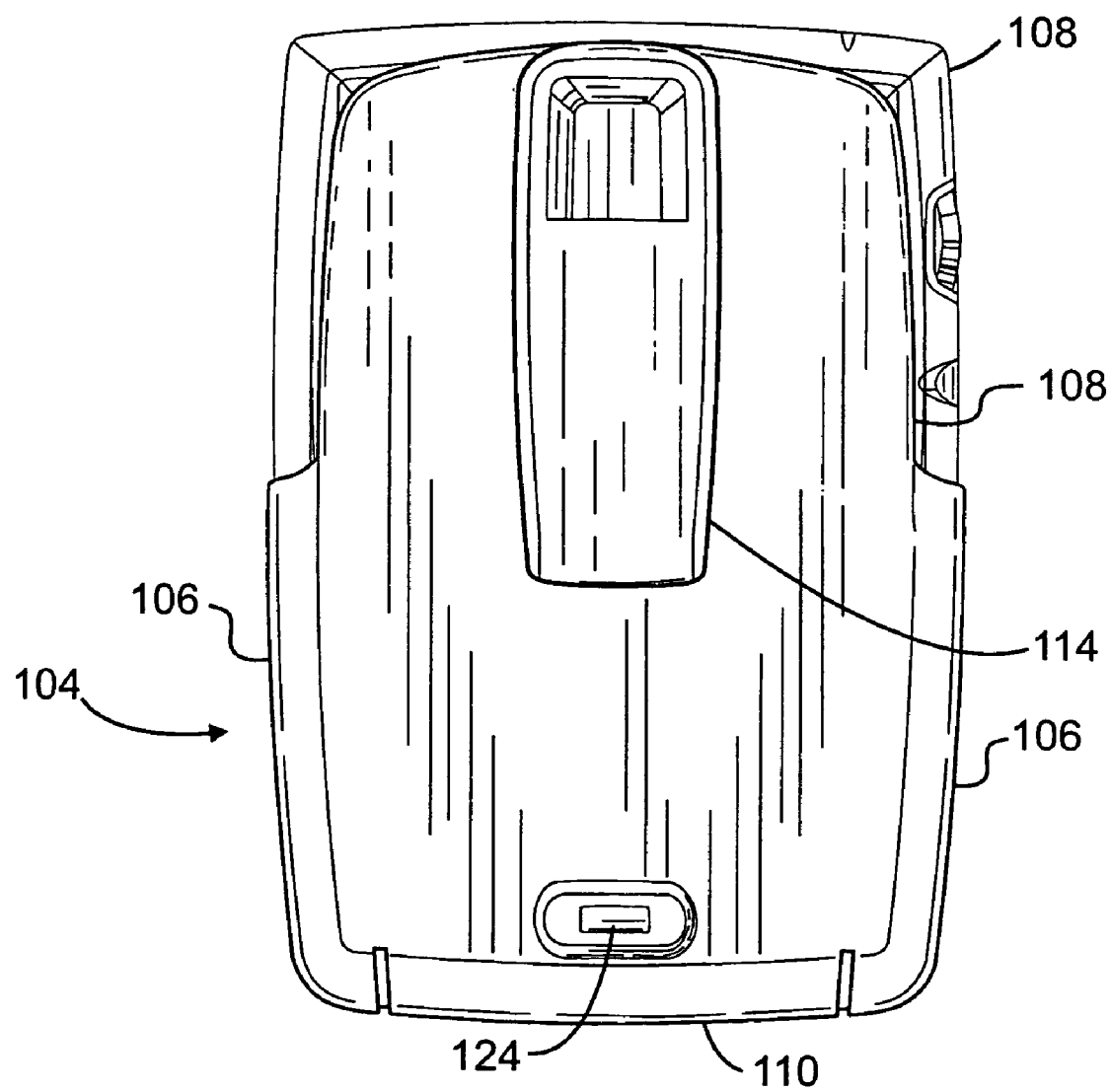
FIG. 3A is a rear view of the holster in FIG. 3 with the device in the holster.

FIG. 3A shows the device inserted into the holster. The back of the holster 108 preferably obscures the display screen 22 of the device. Because the screen 22 is obscured, the device may shut off the screen when stored in the holster to conserve battery power. When in the holster, the device's magnet detection system 80 preferably lines up with the holster magnet 124 so that the magnet 124 is in close physical proximity to the magnet detection system 80.

Figure 4:
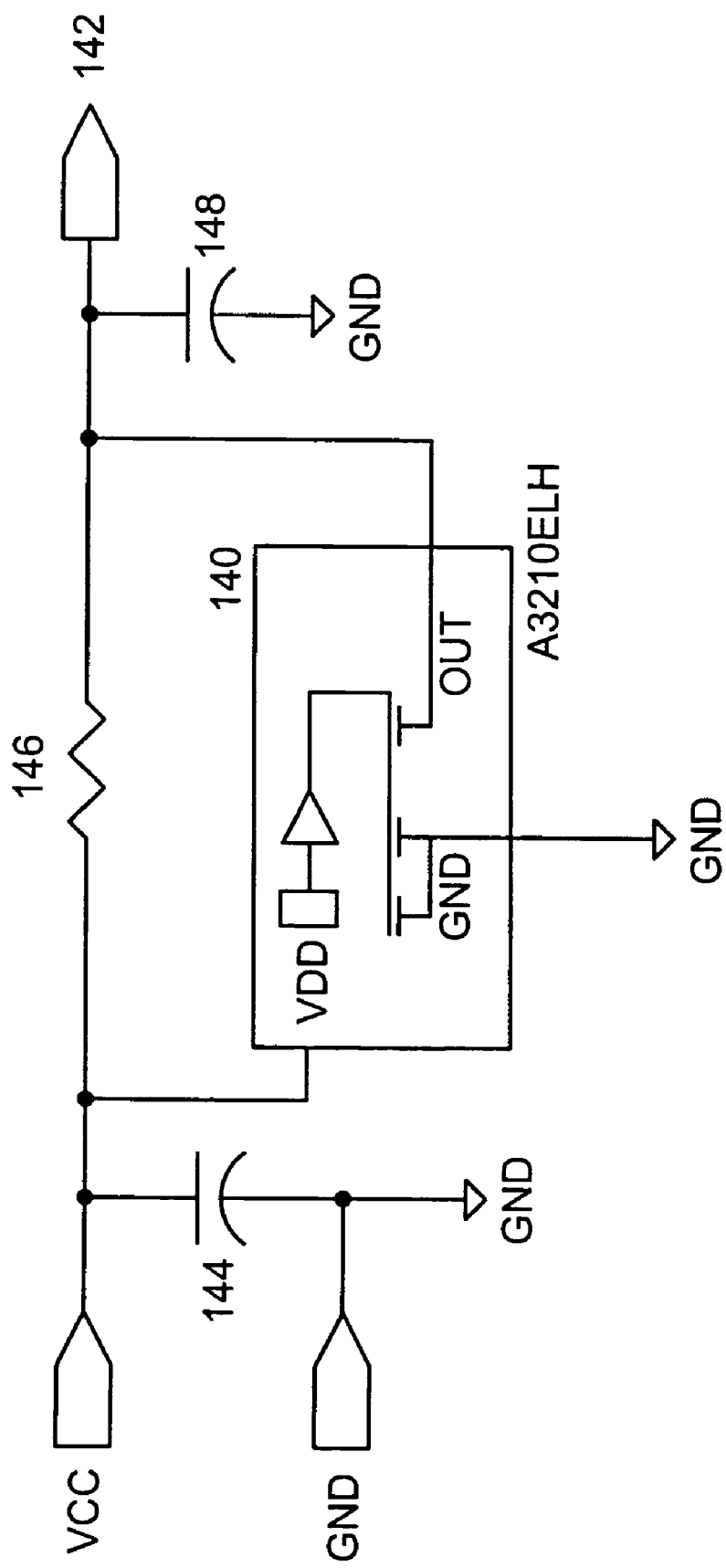
FIG. 4 is a circuit diagram of the magnetic detection system.

FIG. 4 is a circuit diagram of the preferred embodiment of the magnet detection system. The circuit preferably utilizes a Hall effect magnetic proximity sensor to detect the near presence of a permanent magnet mounted in the device's holster. This information is used by system software to alter operation modes in order to effect power saving and user notification differences between the in-holster and out-of-holster states.

The proximity sensor makes use of the Hall effect phenomenon, in which a material with a current flowing through it and a magnetic field passing through it in a direction perpendicular to the direction of the current flow, will develop a voltage across it in a direction that is orthogonal to, and a magnitude that is proportional to the magnitudes of both the current and the field.

In FIG. 4, the magnet itself is not shown schematically, but its presence in close proximity to the sensor device 140 causes that device to change its output from a high level signal to a low level signal. This signal appears on 142, which is preferably read at a digital input port of the system's microprocessor 38. The VCC and GND labels refer to the sensor power supply. Capacitor 144 decouples from the power supply current glitches that occur during switching of the sensor output. Resistor 146 preferably increases the output 144 when the magnet 124 is not present, as this signal is not actually driven to a high level by the sensor 140. Capacitor 148 preferably decouples high-frequency interference that appears on the output signal line 142, especially when the system wireless is transmitting, from the sensor device 140. The sensor device 140 uses very little operating current, and operation may be adversely affected by high-frequency disturbances being rectified by parasitic diodes inside the device.

Figure 5:
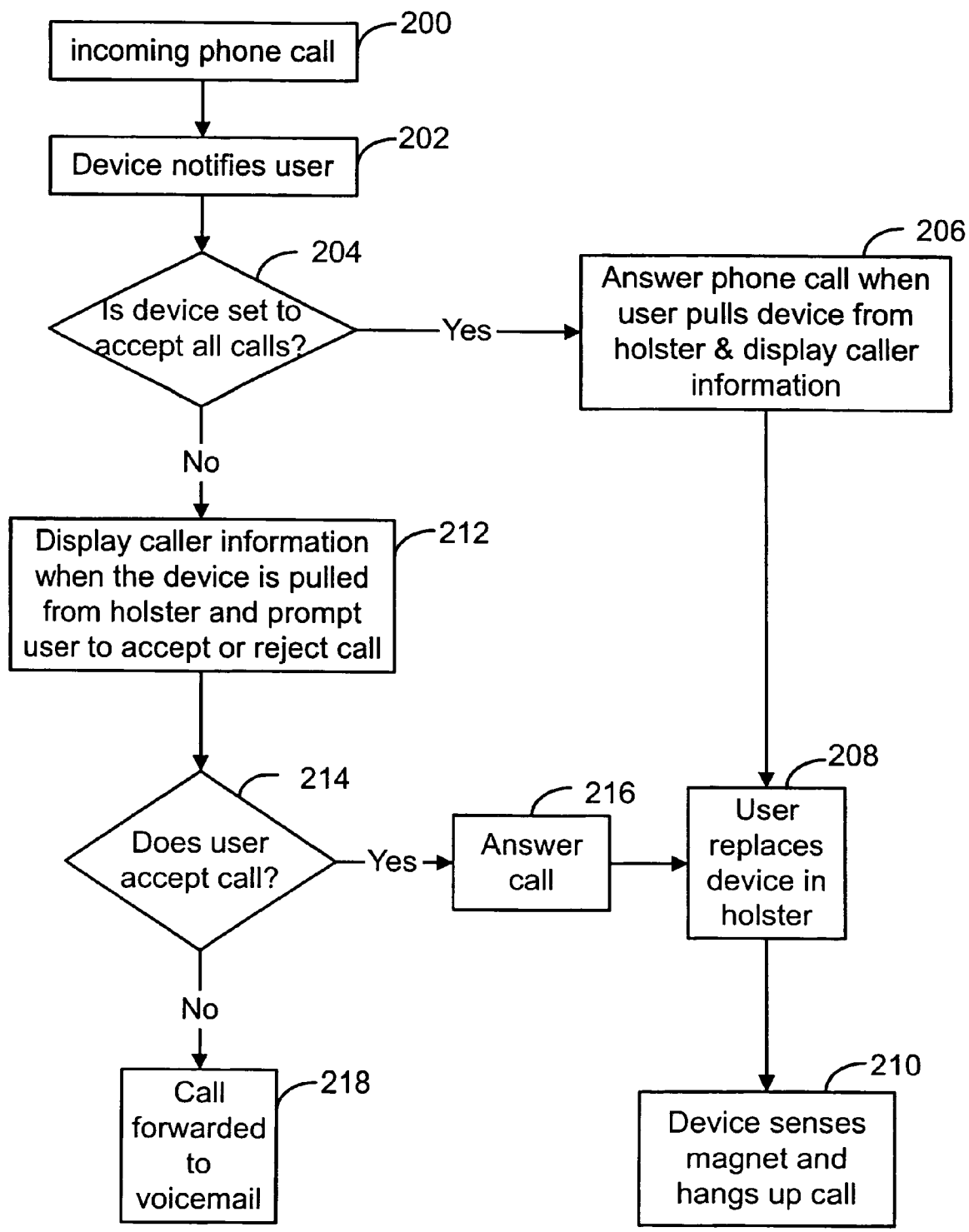
FIG. 5 is a flow diagram describing the method in which the dual-mode device changes from a first state to a second state while in the holster and to a third state when removed from the holster.

FIG. 5 is a flow diagram describing the preferred method in which the device changes from a first state to a second state while in the holster and to a third state when removed from the holster. A device is initially in a first state or an idle state while in its holster, ready to accept a voice call. In step 200, the device enters a second state when it receives a phone call while still in the holster. If the user has set the device to accept all calls, then in step 206, the device preferably changes to the third state by automatically answering the voice call, and displaying the caller information when the user takes the device out of the holster. The device preferably changes from the second state to the third state once it no longer senses the magnet in the holster. When the user has finished the voice call, the user will replace the device in the holster in step 208. In step 210, the device will sense the presence of the holster magnet, and preferably ends the voice call and returns to the first or idle state.

If the device is not set to accept all calls in step 204, usually because the user wishes to see the caller information before answering the voice call, then in step 210, the device will display the caller information on the screen when the user pulls the device from the holster and the device will prompt the user to accept or reject the call. If the user chooses to accept the call in step 212, then the device will answer the call in step 214. Once the user has finished the voice call and replaces the device in the holster in step 208, the device will sense the presence of the holster magnet, and return to the first or idle state.

If the user does not choose to accept the call in step 214, then the call will be rejected and forwarded to voicemail in step 216.

Another embodiment of the invention would be for the device to only answer certain calls by pulling the device from the holster. This could be accomplished by allowing the user to select phone numbers from which the user wishes to receive calls. If a call comes in to the device from one of these phone numbers, then the device will notify the user of the call and answer the call as soon as the user pulls the device from the holster with no further input from the user. The notification may be a type of sound, such as a ring, or vibration. If a call comes in and is not from one of the user-selected phone numbers, the device may notify the user with a different type of notification to allow distinguish from the user-selected phone calls. Once the user pulls the device from the holster, the caller information may be displayed on the screen and the device will preferably prompt the user to accept or reject the call. If the user does not wish to accept any other calls except for the phone numbers the user has selected, the user may be able to forward the unwanted voice calls to voice mail.

A further embodiment of the invention would include the pre-processing of data messages when the device is in the holster. Encrypted and compressed data messages take time to decrypt and decompress. If the device is in the holster and the magnet detection system detects the magnet, then when an encrypted, compressed data message is received by the device, rather than immediately notifying the user of the arrival of the message, the device may first decrypt and decompress the message. Once the message has been processed thusly, the device preferably notifies the user of the message arrival. When the user removes the device from the holster, the device preferably automatically opens the message for the user to view.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A mobile communication device for use with a holster having a magnet, the holster for receiving and holding the mobile communication device, comprising:
    a voice interface for receiving and processing voice calls;
    a data interface for receiving and processing data messages;
    a magnet detection system for detecting the presence of the magnet and for placing the mobile communication device into an idle state;
    a receiver for receiving an incoming signal while the mobile communication device is in the idle state;
    means for determining if the incoming signal is a data message, and for delaying notification of the received data message until the mobile communication device is able to decrypt and decompress the data message, and for subsequently notifying a user of the received data message; and
    means for determining if the incoming signal is a voice call, and for determining whether the voice call originated from a user-selected group of phone numbers, and if so, for notifying the user of the received voice call.

2. The mobile communication device of claim 1, wherein the magnet detection system detects that the mobile communication device has been removed from the holster and thus is no longer in proximity to the magnet; and
    means, responsive to the magnet detection system, for automatically opening the received data message and displaying it to the user of the device.

3. The mobile communication device of claim 1, wherein the magnet detection system detects that the mobile communication device has been removed from the holster and thus is no longer in proximity to the magnet; and
    means, responsive to the magnet detection system, for automatically answering the voice call without the user having to select a button or other interface element of the mobile communication device.

4. The mobile communication device of claim 3, further comprising:
    means for displaying caller identification information regarding the answered voice call.

5. A mobile communication device, comprising:
    a magnet detection system for sensing that the mobile communication device has been placed into a holster having a magnet, and for causing the mobile communication device to be placed into an idle state;
    a receiver for receiving a voice call at the mobile communication device while it is in the holster;
    means for notifying a user of the mobile communication device that the voice call has been received; and
    means for determining whether the mobile communication device is programmed to automatically answer voice calls upon removal of the mobile communication device from the holster;
    means, responsive to the device being configured to automatically answer voice calls, for automatically answering the voice call upon removal of the mobile communication device from the holster; and
    means, responsive to the device not being configured to automatically answer voice calls, for displaying caller information regarding the received voice call and for prompting the user to answer the call upon removal of the mobile communication device from the holster.

6. The mobile communication device of claim 5, wherein the processor automatically displays caller information regarding the received voice call.

7. The mobile communication device of claim 5, wherein the magnet detection system senses the holster magnet when the mobile communication device is returned to the holster and in response thereto, the processor automatically terminates the voice call causes the device to be placed into the idle state.

8. The mobile communication device of claim 5, further comprising:
    a memory for storing a user selected group of phone numbers that are to be automatically answered;
    means for determining whether the received voice call is from a phone number on the stored user selected group of phone numbers;
    wherein if the received voice call is on the user selected group of phone numbers, then the processor automatically answers the voice call when the device is removed from the holster; and
    wherein if the received voice call is not on the user selected group of phone numbers, then the processor displays caller information regarding the received voice call and prompts the user to answer the call.

9. The mobile communication device of claim 8,
    wherein if the received voice call is on the user selected group of phone numbers then the processor executes a first notification on the mobile communication device; and
    wherein if the received voice call is not on the user selected group of phone numbers then the processor executes a second notification on the mobile communication device.

10. A mobile communication device, comprising:
    a magnet detection system that detects the presence of a magnet and places the mobile communication device into an idle state;
    a receiver for receiving an encrypted and compressed data message at the mobile communication device;
    means for delaying notification of the received data message until the mobile communication device is able to decrypt and decompress the data messages, and once the data message has been decrypted and decompressed, for notifying a user of the received data message; and
    means, responsive to the magnet detection system detecting that the mobile communication device is no longer in proximity to the magnet, for automatically opening and displaying the decrypted and decompressed data message to the user.

11. A method for processing data messages in a mobile communication device having a data interface for receiving and processing data messages, and a magnet detection system, the method comprising:
    placing the mobile communication device into a holster having a magnet, wherein the magnet detection system detects the presence of the magnet and places the mobile communication device into an idle state;
    receiving an incoming signal at the mobile communication device;
    determining whether the incoming signal is a data message, and if so, then delaying notification of the received data message until the mobile communication device is able to decrypt the data message, and once the data message has been decrypted, then notifying a user of the received data message.

12. The method of claim 11, further comprising:
determining if the incoming signal is a voice call, and if so, then determining whether the voice call originated from a user-selected group of phone numbers, and if so, then notifying the user of the received voice call.

13. The method of claim 12, further comprising:
removing the mobile communication device from the holster, the magnet detection system detecting that the device is no longer in proximity to the magnet; and
in response thereto, automatically answering the voice call without the user having to select a button or other interface element of the mobile communication device.

14. The method of claim 13, further comprising:
in further response thereto, displaying caller identification information regarding the answered voice call.

15. The method of claim 11, further comprising:
removing the mobile communication device from the holster, the magnet detection system detecting that the device is no longer in proximity to the magnet; and
in response thereto, automatically opening the received data message and displaying it to the user of the device.

16. A method for processing data messages in a mobile communication device having a data interface for receiving and processing data messages, and a magnet detection system, the method comprising:
placing the mobile communication device into a holster having a magnet, wherein the magnet detection system detects the presence of the magnet and places the mobile communication device into an idle state;
receiving an incoming signal at the mobile communication device;
determining whether the incoming signal is a data message, and if so, then delaying notification of the received data message until the mobile communication device is able to decompress the data message, and once the data message has been decompressed, then notifying a user of the received data message.

17. The method of claim 16, further comprising:
determining if the incoming signal is a voice call, and if so, then determining whether the voice call originated from a user-selected group of phone numbers, and if so, then notifying the user of the received voice call.

18. The method of claim 17, further comprising:
removing the mobile communication device from the holster, the magnet detection system detecting that the device is no longer in proximity to the magnet; and
in response thereto, automatically answering the voice call without the user having to select a button or other interface element of the mobile communication device.

19. The method of claim 18, further comprising:
in further response thereto, displaying caller identification information regarding the answered voice call.

20. The method of claim 16, further comprising:
removing the mobile communication device from the holster, the magnet detection system detecting that the device is no longer in proximity to the magnet; and
in response thereto, automatically opening the received data message and displaying it to the user of the device.

21. A mobile communication device for use with a holster having a magnet, the holster for receiving and holding the mobile communication device, comprising:
a data interface for receiving and processing data messages;
a magnet detection system for detecting the presence of the magnet and for placing the mobile communication device into an idle state;
a receiver for receiving an incoming signal while the mobile communication device is in the idle state;
means for determining if the incoming signal is a data message, and for delaying notification of the received data message until the mobile communication device is able to decrypt the data message, and for subsequently notifying a user of the received data message.

22. The mobile communication device of claim 21, further comprising:
a voice interface for receiving and processing voice calls; and
means for determining if the incoming signal is a voice call, and for determining whether the voice call originated from a user-selected group of phone numbers, and if so, for notifying the user of the received voice call.

23. The mobile communication device of claim 22, wherein the magnet detection system detects that the mobile communication device has been removed from the holster and thus is no longer in proximity to the magnet; and
means, responsive to the magnet detection system, for automatically answering the voice call without the user having to select a button or other interface element of the mobile communication device.

24. The mobile communication device of claim 23, further comprising:
means for displaying caller identification information regarding the answered voice call.

25. The mobile communication device of claim 21, wherein the magnet detection system detects that the mobile communication device has been removed from the holster and thus is no longer in proximity to the magnet; and
means, responsive to the magnet detection system, for automatically opening the received data message and displaying it to the user of the device.

26. A mobile communication device for use with a holster having a magnet, the holster for receiving and holding the mobile communication device, comprising:
a data interface for receiving and processing data messages;
a magnet detection system for detecting the presence of the magnet and for placing the mobile communication device into an idle state;
a receiver for receiving an incoming signal while the mobile communication device is in the idle state;
means for determining if the incoming signal is a data message, and for delaying notification of the received data message until the mobile communication device is able to decompress the data message, and for subsequently notifying a user of the received data message.

27. The mobile communication device of claim 26, further comprising:
a voice interface for receiving and processing voice calls; and
means for determining if the incoming signal is a voice call, and for determining whether the voice call originated from a user-selected group of phone numbers, and if so, for notifying the user of the received voice call.

28. The mobile communication device of claim 27, wherein the magnet detection system detects that the mobile communication device has been removed from the holster and thus is no longer in proximity to the magnet; and means, responsive to the magnet detection system, for automatically answering the voice call without the user having to select a button or other interface element of the mobile communication device.

29. The mobile communication device of claim 28, further comprising:

means for displaying caller identification information regarding the answered voice call.

30. The mobile communication device of claim 26, wherein the magnet detection system detects that the mobile communication device has been removed from the holster and thus is no longer in proximity to the magnet; and means, responsive to the magnet detection system, for automatically opening the received data message and displaying it to the user of the device.

* * * * *